United States Patent
Kimura (10) Patent No.: US 11,218,088 B2
(45) Date of Patent: Jan. 4, 2022

(54) OSCILLATION ACTUATOR AND ELECTRONIC DEVICE HAVING OSCILLATION ACTUATOR

(71) Applicant: CANON KABUSHIKI KAISHA, Tokyo (JP)

(72) Inventor: Atsushi Kimura, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 16/532,160

(22) Filed: Aug. 5, 2019

(65) Prior Publication Data
US 2020/0052614 A1 Feb. 13, 2020

(30) Foreign Application Priority Data

Aug. 9, 2018 (JP) .............................. JP2018-150554

(51) Int. Cl.
*H02N 2/00* (2006.01)
*G02B 7/04* (2021.01)
*H02N 2/02* (2006.01)
*H02N 2/10* (2006.01)

(52) U.S. Cl.
CPC ............... *H02N 2/001* (2013.01); *G02B 7/04* (2013.01); *H02N 2/026* (2013.01); *H02N 2/103* (2013.01)

(58) Field of Classification Search
CPC ........ H02N 2/001; H02N 2/026; H02N 2/103; H02N 2/0055; H02N 2/0015; H02N 2/12; H02N 2/005; G02B 7/04; G02B 7/08
See application file for complete search history.

(56) References Cited

U.S. PATENT DOCUMENTS

2016/0126864 A1* 5/2016 Araki ................. G02B 7/09
359/393
2019/0222145 A1* 7/2019 Oda ...................... H02N 2/026

FOREIGN PATENT DOCUMENTS

| JP | 2015-195720 A | 11/2015 |
| JP | 2017-108496 A | 6/2017 |
| JP | 2017-200260 A | 11/2017 |

* cited by examiner

*Primary Examiner* — Emily P Pham
(74) *Attorney, Agent, or Firm* — Canon U.S.A., Inc. I.P. Division

(57) ABSTRACT

An oscillation actuator of the present disclosure includes an oscillation body, a contact body configured to be in contact with the oscillation body, a holding member configured to hold the oscillation body, the holding member having a through hole, a pressing member configured to press the oscillation body through the through hole, and an oscillation damping member configured to be in contact with the holding member and the pressing member between the holding member and the pressing member.

12 Claims, 7 Drawing Sheets

OSCILLATION ACTUATOR AND ELECTRONIC DEVICE HAVING OSCILLATION ACTUATOR

BACKGROUND OF THE INVENTION

Field of the Invention

The present disclosure relates to an oscillation actuator.

Description of the Related Art

Among actuators, techniques for an oscillation actuator have been proposed. In an oscillation actuator, a contact body that is in contact with an oscillation body (for example, piezoelectric element and electric energy-mechanical energy conversion element) is driven by oscillation of the oscillation body (i.e., the oscillation body and the contact body are relatively moved).

For example, Japanese Patent Application Laid-Open No. 2017-200260 discusses an oscillation actuator that has one oscillation body and a plurality of oscillation bodies, to achieve linear driving and rotary driving (see FIGS. 1 and 9 in Japanese Patent Application Laid-Open No. 2017-200260, respectively). The conventional technique will be described with reference to FIG. 4A to 6C.

Figure 4A:
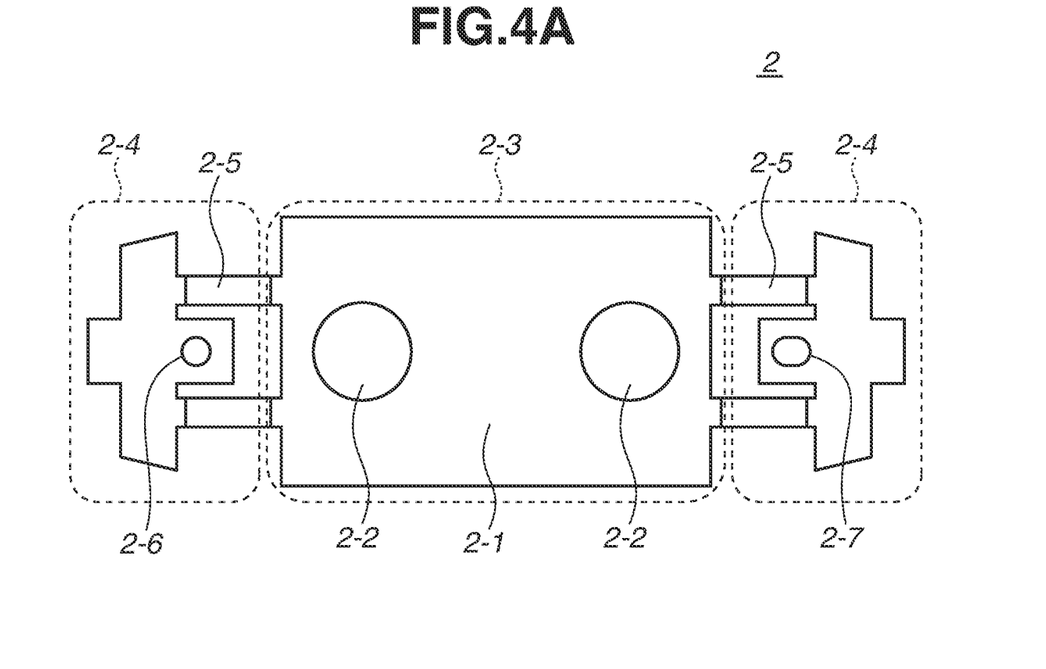
FIG. 4A is a plan view illustrating an elastic body according to a conventional example.
Figure 4B:
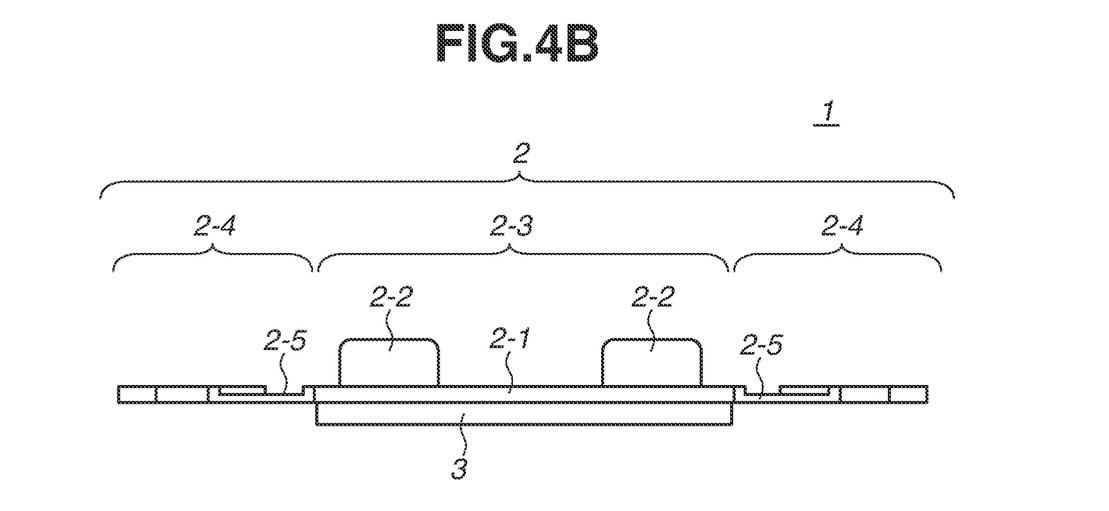
FIG. 4B is a side view illustrating an oscillation body.

FIG. 4A is a plan view of an oscillation body, and FIG. 4B is a side view of the oscillation body. In FIGS. 4A and 4B, an oscillation body 1 includes a piezoelectric element 3 which is formed into a rectangular (quadrangular) thin plate shape and an elastic body 2 which is integrally bonded to (one plane of) the piezoelectric element 3. The elastic body 2 includes a main body 2-3 and support portions 2-4.

The main body 2-3 includes a base portion 2-1, which oscillates together with the piezoelectric element 3 and is formed into a rectangular thin plate shape, and two protruding portions 2-2, which are formed to protrude on one plane of the base portion 2-1.

The support portions 2-4 each have flexibility, and are integrally and structurally formed with the main body 2-3. The support portions 2-4 each include a thin portion 2-5 which is partially thin so that oscillation of the main body 2-3 is prevented from being transmitted outside the main body 2-3 as much as possible. The support portions 2-4 further have a circular hole 2-6 and an elongate hole 2-7, respectively, which are used for positioning when the piezoelectric element 3 is bonded or the oscillation body 1 is assembled.

Figure 5:
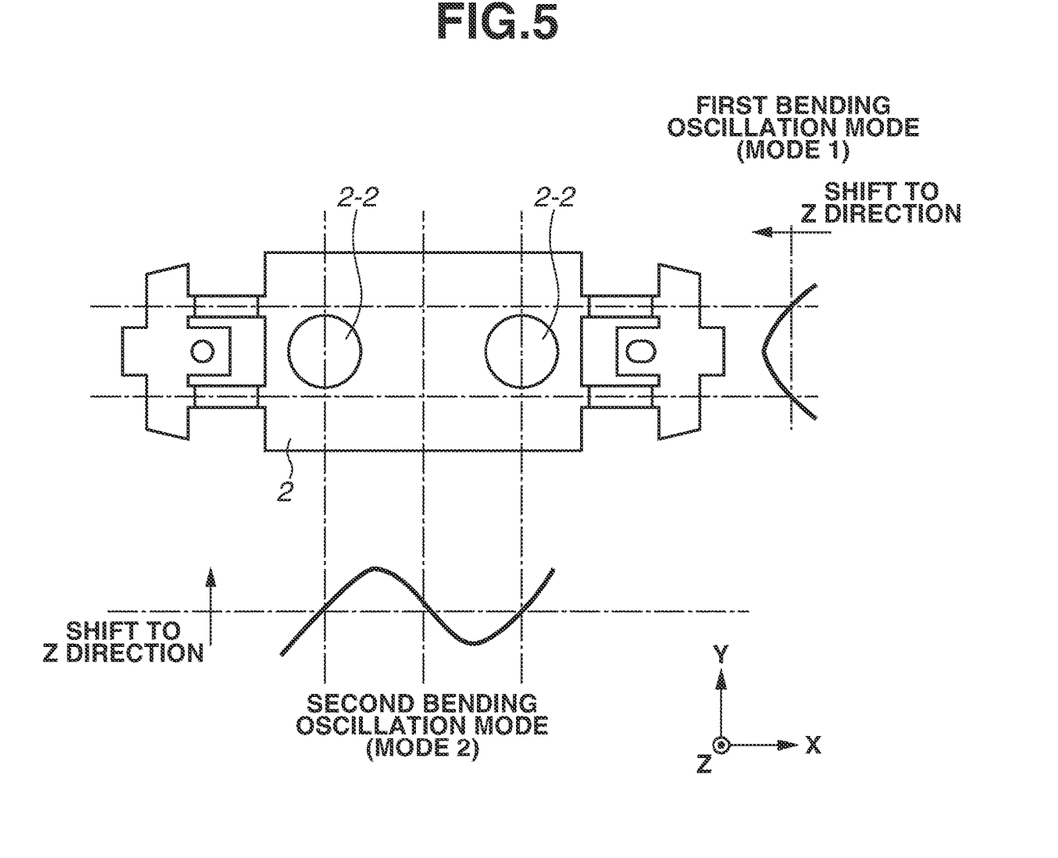
FIG. 5 is an explanatory diagram illustrating an oscillation mode of the oscillation body according to the conventional example.

As illustrated in FIG. 5, in a bending oscillation mode in which the oscillation body 1 oscillates in a longitudinal (X) direction and in a transverse (Y) direction of the oscillation body 1, leading edges of the protruding portions 2-2 make an ellipse movement, whereby a contact body (not illustrated) is driven in an X direction in the drawing (the not-illustrated contact body relatively moves with respect to the oscillation body 1).

Figure 6A:
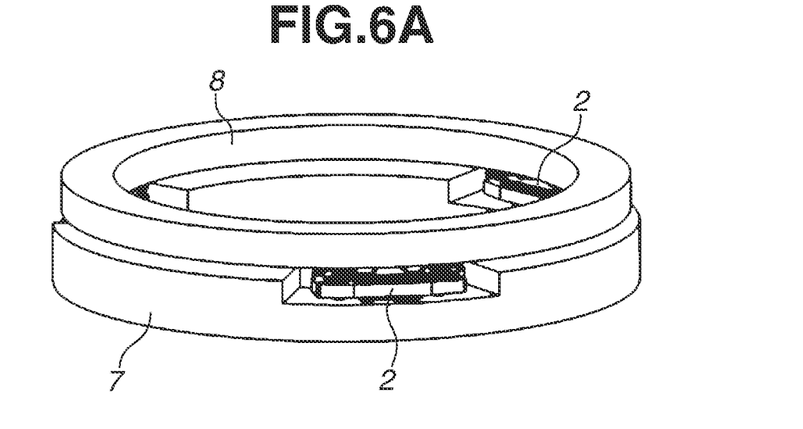
FIG. 6A is a developed perspective view illustrating some disassembled parts in the oscillation actuator according to the conventional example.
Figure 6B:
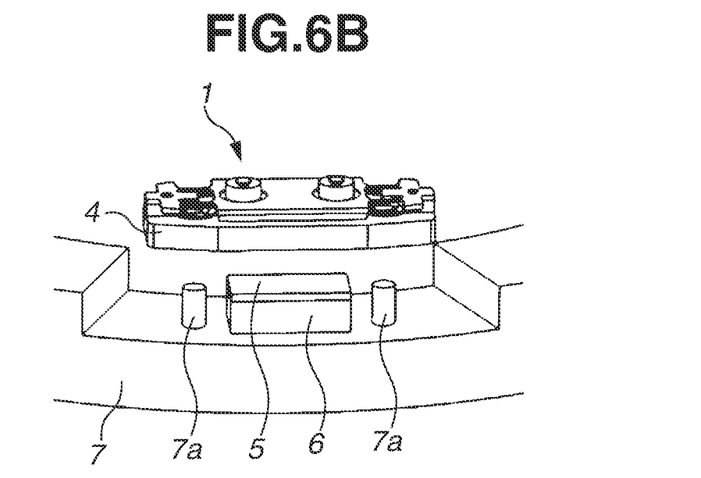
FIG. 6B is an enlarged developed perspective view illustrating the oscillation actuator (excluding a contact body).
Figure 6C:
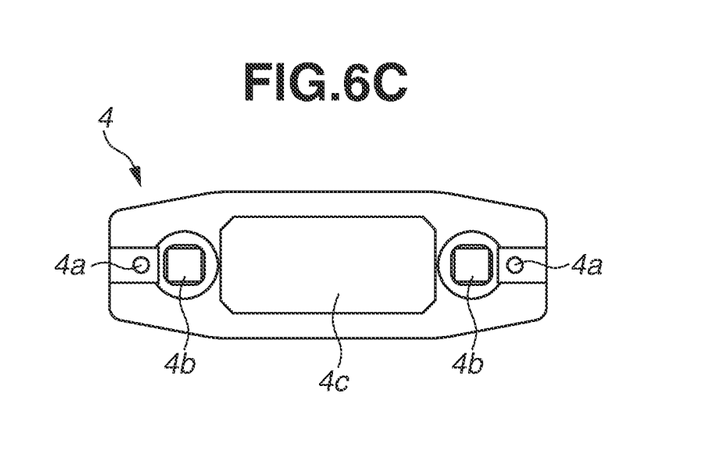
FIG. 6C is a plan view illustrating a holding member.

FIG. 6A is a perspective view illustrating a rotary actuator in which three (a plurality of) oscillation bodies (i.e., oscillation actuator main body having oscillation bodies) illustrated in FIGS. 4A and 4B are disposed on its circumference. FIG. 6B is an enlarged developed perspective view illustrating a periphery of the oscillation body 1. FIG. 6C is a plan view of a holding member. The "oscillation actuator main body" means a portion excluding the contact body in the oscillation actuator.

As illustrated in FIG. 6A, the rotary actuator is configured in such a manner that three (a plurality of) oscillation bodies 1 are disposed on a circular base (support member) 7, and a rotor (contact body 8 which is in contact with the oscillation bodies 1, is driven to be rotated. The oscillation bodies 1 each are held to a small base (holding member 4) by fitting pins 4a (see FIG. 6C) of the holding member 4 into the circular hole 2-6 and the elongate hole 2-7 (see FIG. 4A) of the support portions 2-4, respectively, and bonding them. The holding member 4 is positioned to be freely movable in a pressurizing direction by fitting pins 7a (see FIG. 6B) of the support member 7 into holes 4b (see FIG. 6C) of the holding member 4, respectively. The holding member 4 has a rectangular through hole 4c (see FIG. 6C), and a pressing member 6 (that presses the oscillation body 1) is provided within the through hole 4c with play. The pressing member 6 is in contact with the support member 7 to press the oscillation body 1 via a cushioning member 5 using a pressurizing member (for example, a spring), not illustrated. The pressing member 6 is relatively movable in the pressurizing direction with respect to the holding member 4. With this configuration, a reaction force to the support portions 2-4 under the pressure is reduced, whereby peeling of the adhered piezoelectric element is prevented.

In Japanese Patent Application Laid-Open No. 2017-200260, an abnormal noise occurs due to undesired oscillation that is generated on the holding member (a rigid body mode in which the holding member is a rigid body) in the oscillation actuator.

An example of means for preventing undesired oscillation which is generated on the holding member is upsizing the holding member (mass) 4 to decrease a resonance frequency of the rigid body mode and whereby to eliminate the undesired oscillation from an audible range. However, a space available for the oscillation actuator is extremely limited, thus it is difficult to employ such means.

Another example of means is decreasing rigidity of the support portions (springs) 2-4 to decrease the resonance frequency of the rigid body mode and whereby to eliminate the undesired oscillation from an audible field. However, a resonance frequency for an oscillation mode which is used for driving (driving oscillation mode) is also changed, thus it is also difficult to employ such means.

SUMMARY OF THE INVENTION

The present disclosure is directed to an oscillation actuator that can prevent generation of an abnormal noise caused by an undesired oscillation mode generated on a holding member without enlarging the holding member or reducing rigidity of a support portion.

According to an aspect of the present disclosure, an oscillation actuator includes an oscillation body, a contact body configured to be in contact with the oscillation body, a holding member configured to hold the oscillation body, the holding member having a through hole, a pressing member configured to press the oscillation body through the through hole, and an oscillation damping member configured to be in contact with the holding member and the pressing member between the holding member and the pressing member.

According to another aspect of the present disclosure, an oscillation actuator main body includes an oscillation body, a holding member configured to hold the oscillation body, the holding member having a through hole, a pressing member configured to press the oscillation body through the through hole, and an oscillation damping member configured to be in contact with the holding member and the pressing member between the holding member and the pressing member.

Further features of the present disclosure will become apparent from the following description of exemplary embodiments with reference to the attached drawings.

DESCRIPTION OF THE EMBODIMENTS

Exemplary embodiments of an improved oscillation actuator the present disclosure will be described below.

Figure 1A:
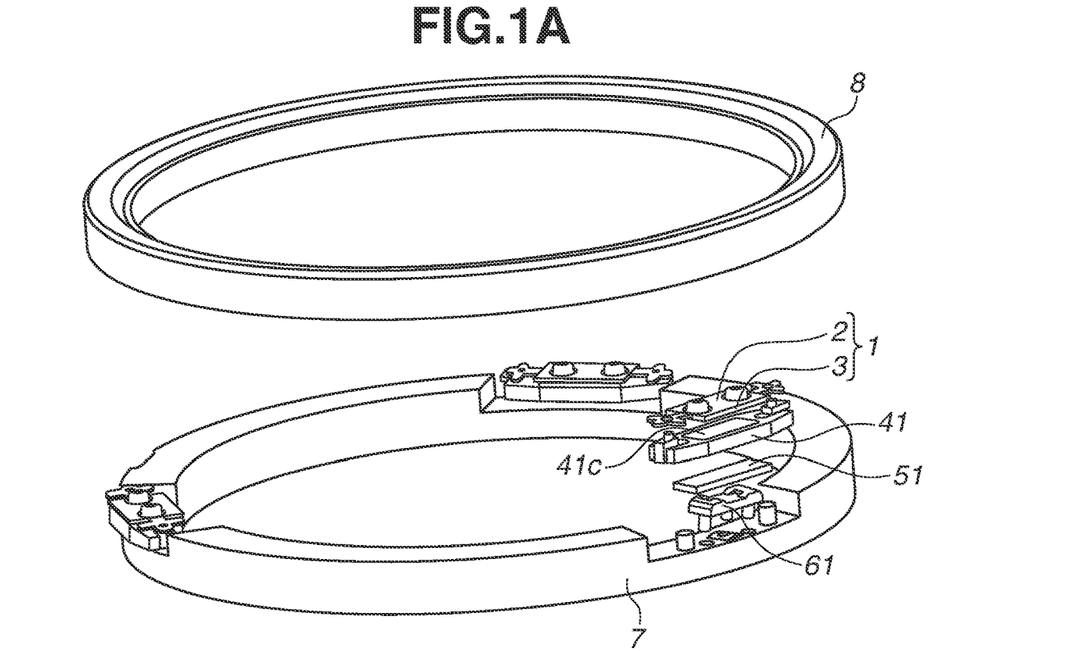
FIG. 1A is a developed perspective view illustrating some disassembled parts in an oscillation actuator according to a first exemplary embodiment of the present disclosure.
Figure 1B:
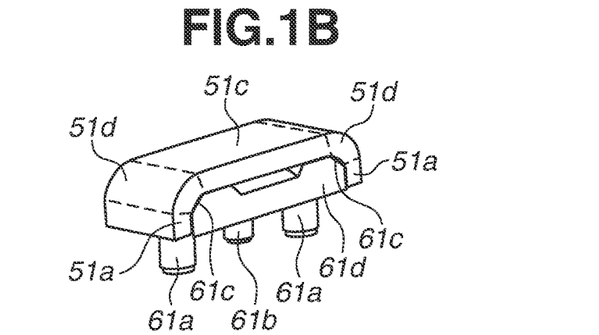
FIG. 1B is an enlarged perspective view illustrating a pressing member on which an oscillation damping member is disposed (bonded).
Figure 1C:
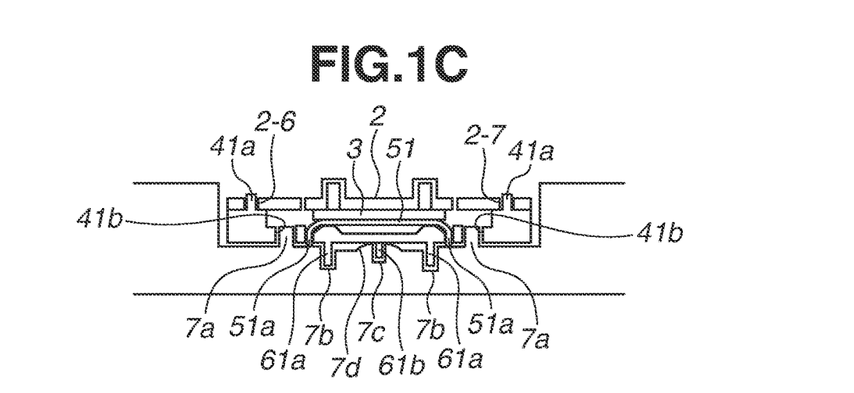
FIG. 1C is a cross sectional view illustrating the oscillation actuator (excluding a contact body).

FIGS. 1A to 1C illustrate a first exemplary embodiment of the present disclosure. FIG. 1A is a developed perspective view illustrating some disassembled parts in an oscillation actuator. FIG. 1A is the developed perspective view illustrating disassembled parts in a rotary actuator in which three (a plurality of) oscillation bodies (an oscillation actuator main body having the oscillation bodies) are disposed on its circumference. FIG. 1B is an enlarged perspective view illustrating a pressing member on (to) which an oscillation damping member (for example, felt) is disposed (bonded). 1C is a cross sectional view illustrating the oscillation actuator (excluding a contact body). Hereinafter, in the drawings, identical reference symbols are given to identical portions, respectively, between exemplary embodiments of the present disclosure and the conventional example (FIGS. 6A to 6C)

An oscillation body 1 is held to a holding member 41 by fitting pins 41a disposed on the holding member 41 into a circular hole 2-6 and an elongate hole 2-7 provided on support portions 2-4, respectively, of the oscillation body 1 and bonding them using an adhesive.

Pins 7a disposed on a base (support member) 7 are fitted into holes 41b, respectively, provided on the holding member 41. As a result, the holding member 41 is positioned in a manner such that movement of the holding member 41 in a pressing direction of a pressing member 61 (a direction orthogonal to a relative moving direction of the oscillation body 1 and a contact body 8, or a pressurizing direction of a not-illustrated pressurizing member) is not prevented. The holding member 41 has a through hole 41c which pierces the holding member 41 to the pressing direction and has a rectangular shape as viewed from the pressing direction. The pressing member 61 fits in the through hole 41c when the oscillation actuator is assembled. The pressing member 61 presses the oscillation body 1 through the through hole 41c.

The pressing member 61 allows positioning pins 61a and 61b disposed on the pressing member 61 to be fitted into holes 7b and 7c provided on the support member 7, respectively, whereby the pressing member 61 is positioned. The positioning pins 61a and 61b are fitted into the holes 7b and 7c, respectively, with play (clearance). Thus, the pressing member 61 is rotatable in a pitching direction by a pressing portion 61d formed in an approximately rectangular shape being in contact with a semi-circular column surface (protruding portion) 7d formed on the support member 7. The pressing member 61 is in contact with the support member 7 (protruding portion 7d) to transmit a pressurizing force generated by the pressurizing member (for example, spring), not illustrated, to the oscillation body 1 via an oscillation damping member 51 such as felt. The pressing member 61 is positioned in a manner such that movement of the pressing member 61 in the pressing direction of the pressing member 61 (the direction orthogonal to the relative moving direction of the oscillation body 1 and the contact body 8, or the pressurizing direction of the not-illustrated pressurizing member) is not prevented with respect to the holding member 41 (positioned in a displaceable manner).

In the present exemplary embodiment, a length of the oscillation damping member 51 in a longitudinal direction (a total length of end portions 51a, a central portion 51c, and connecting portions 51d) is longer than a length of the pressing member 61 (pressing portion 61d) in a longitudinal direction. The connecting portions 51d are portions for connecting the end portions 51a and the central portion 51c.

As illustrated in FIG. 1B, the oscillation damping member 51 is bent along a side surface of the pressing member 61 (pressing portion 61d) in the longitudinal direction when the oscillation actuator is assembled. Thus, the end portions (oscillation damping portions) 51a are formed between the holding member 41 and the pressing member 61 in a manner such that the end portions 51a are in contact with the holding member 41 and the pressing member 61, when the oscillation actuator is assembled. The state where "the oscillation damping portions are in contact with the holding member and the pressing member" is not limited to a direct contact state where another member does not exist between the oscillation damping portion d the holding member and between the oscillation damping portion and the pressing member. The contact state may be an indirect contact state where another member may exist at least one of between the oscillation damping portion and the holding member and between the oscillation damping portion the pressing member.

Ridge lines 61c of the pressing member 61 are chamfered into a C shape. This chamfering enables the oscillation damping member 51 to be easily bent when the oscillation actuator is assembled. As the oscillation damping member 51, a material such as felt having a small friction coefficient is preferably used. Because of the small friction coefficient, the degree of freedom in movement of the pressing member 61 in the pressing direction is not excessively limited between the holding member 41 and the pressing member 61 when the oscillation damping member 51 (oscillation damping portions 51*a*) is in contact with the holding member 41 and the pressing member 61. That is, the oscillation damping member 51 has a small impact on the pressing force of the pressing member 61.

Figure 7A:
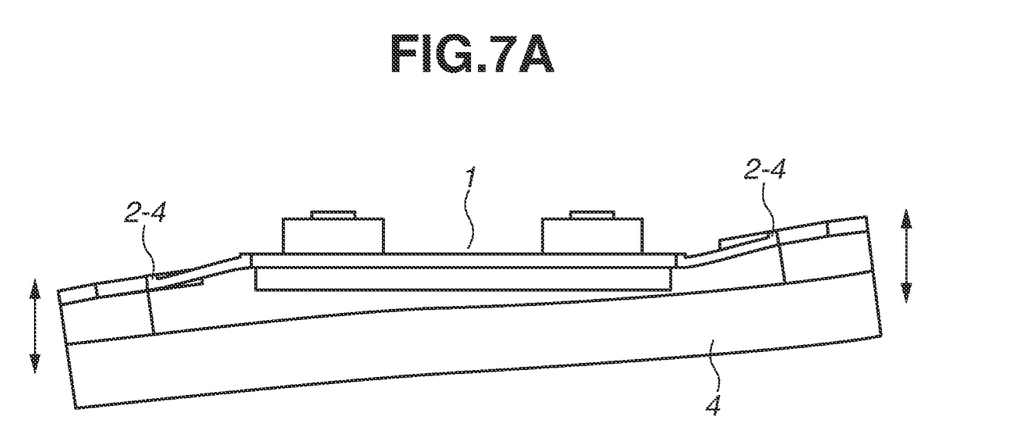
FIGS. 7A and 7B are explanatory diagrams illustrating an undesired oscillation mode generated on the holding member.
Figure 7B:
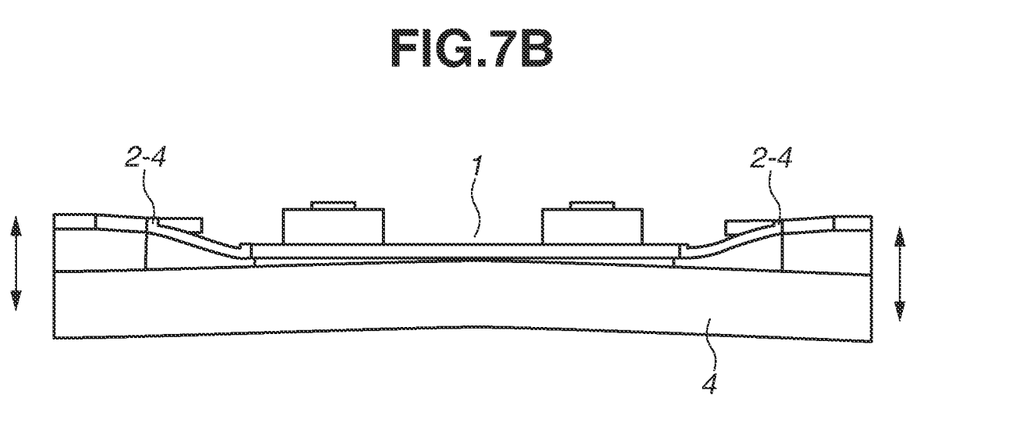

The oscillation damping member 51 (oscillation damping portions 51*a*) can damp undesired oscillation which is generated on the holding member 41 as illustrated in FIGS. 7A and 7B. This can prevent generation of an abnormal noise due to the undesired oscillation mode, without upsizing the holding member 41 or reducing rigidity of the support portions 2-4 of the elastic body 2 (while a decrease in performance of the oscillation actuator is being prevented).

The ridge lines 61*c* of the pressing member 61 have preferably a chamfered shape (for example, a C chamfered shape or an R chamfered shape).

In the present exemplary embodiment, the oscillation damping member 51 which is one part (integrally formed) is used. That is, one part, which includes the end portions (oscillation damping portions) 51*a* of the oscillation damping member 51 and the central portion (contact portion) 51*c* of the oscillation damping member 51 which is in contact with the oscillation body 1 and the pressing member 61, is used. Alternatively, the oscillation damping portions 51*a* and the contact portion 51*c* may be separated parts (a plurality of parts). In a case of the separated parts, the end portions (oscillation damping portions) 51*a* may be disposed on (bonded to) the side surface of the pressing portion 61*d* of the pressing member 61, or may be disposed on (bonded to) the through hole 41*c* of the holding member 41 (an inner periphery of the holding member 41).

In the present exemplary embodiment, the oscillation damping member 51 is disposed on (bonded to) the side surface of the pressing member 61 (the pressing portion 61*d*) in the longitudinal direction (in the relative moving direction of the oscillation body 1 and the contact body 8). Alternatively, the oscillation damping member 51 may be disposed on (bonded to) the side surface of the pressing portion 61*d* of the pressing member 61 in a transverse direction (the direction orthogonal to the relative moving direction of the oscillation body 1 and the contact body 8).

Figure 2A:
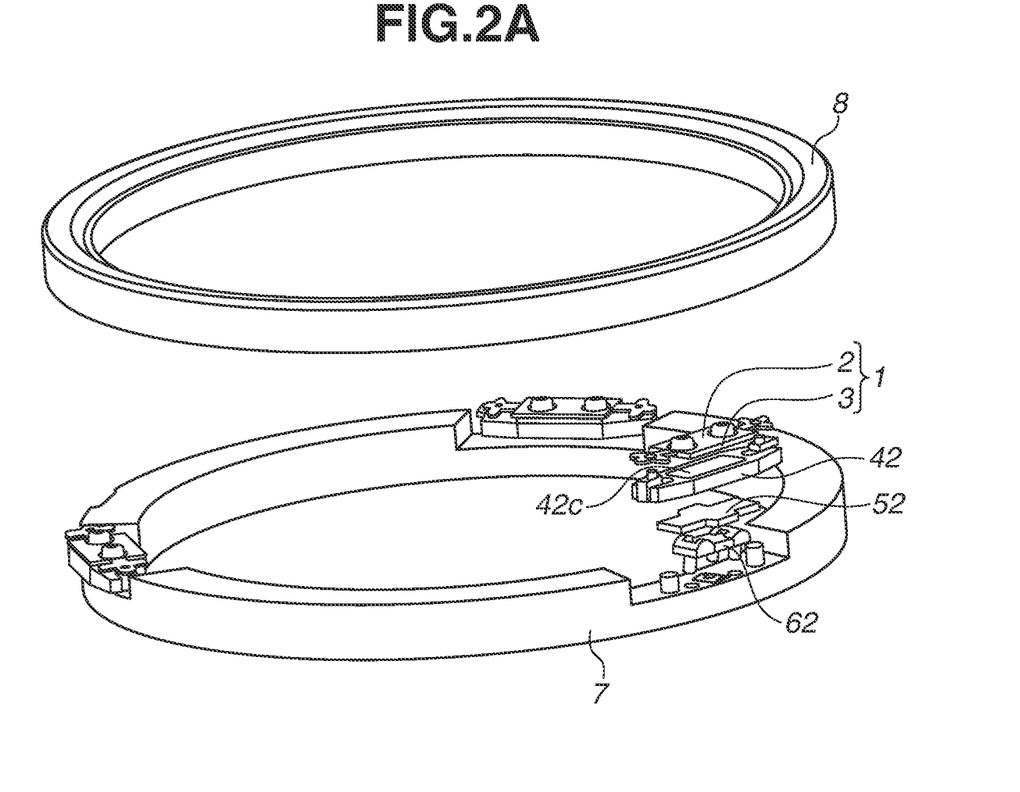
FIG. 2A is a developed perspective view illustrating some disassembled parts in an oscillation actuator according to a second exemplary embodiment of the present disclosure.
Figure 2B:
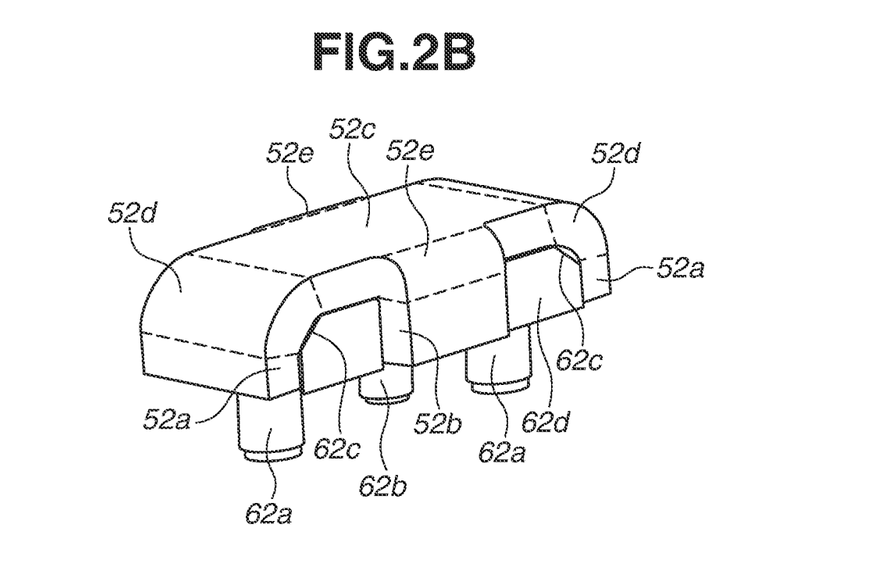
FIG. 2B is an enlarged perspective view illustrating a pressing member on (to) which an oscillation damping member is disposed (bonded).

FIGS. 2A and 2B illustrate a second exemplary embodiment of the present disclosure. FIG. 2A is a developed perspective view illustrating some disassembled parts in an oscillation actuator. FIG. 2A is the developed perspective view illustrating the assembled parts of a rotary actuator in which three (a plurality of) oscillation bodies (oscillation actuator main body having them) are disposed on its circumference. FIG. 2B is an enlarged perspective view illustrating a pressing member on (to) which an oscillation damping member is disposed (bonded). Hereinafter, in the drawings, identical reference symbols are given to identical portions, respectively, between the present exemplary embodiment of the present disclosure and the first exemplary embodiment of the present disclosure in FIGS. 1A to 1C.

A pressing member 62 allows positioning pins 62*a* and 62*b*, which are disposed on the pressing member 62, to be fitted into holes 7*b* and 7*c* provided on a support member 7, respectively, whereby the pressing member 62 is positioned.

The positioning pins 62*a* and 62*b* are fitted into the holes 7*b* and 7*c*, respectively, with play (clearance). Thus, the pressing member 62 is rotatable in a pitching direction by a pressing portion 62*d* formed in an approximately rectangular shape being in contact with a semi-circular column surface (protruding portion) 7*d* formed on the support member 7. The pressing member 62 is in contact with the support member 7 (protruding portion 7*d*) to transmit a pressurizing force generated by a pressurizing member (for example, a spring) (not illustrated), to the oscillation body 1 via an oscillation damping member 52 such as felt. The pressing member 62 is positioned in a manner such that movement of the pressing member 62 in the pressing direction of the pressing member 62 (a direction orthogonal to a relative moving direction of the oscillation body 1 and the contact body 8, or the pressurizing direction of the not-illustrated pressurizing member) is not prevented with respect to the holding member 42 (positioned in a displaceable manner).

In the present exemplary embodiment, the oscillation damping member 52 has a cross shape. A length of the oscillation damping member 52 in a longitudinal direction (a total length of end portions 52*a*, a central portion 52*c*, and the connecting portions 52*d*) is longer than a length of the pressing member 62 (approximately rectangular pressing portion 62*d*) in a longitudinal direction (the relative moving direction of the oscillation body 1 and the contact body 8). The connecting portions 52*d* are portions for connecting the end portions 52*a* and the central portion 51*c*, respectively. A partial length of the oscillation damping member 52 (a total length of end portions 52*b*, the central portion 52*c*, and connecting portions 52*e*) in a transverse direction (the direction orthogonal to the relative moving direction of the oscillation body and the contact body 8) is longer than a length of the pressing member 62 (pressing portions 62*d*) in the transverse direction. The connecting portions 52*e* are portions for connecting the end portions 52*b* and the central portion 52*c*, respectively.

As illustrated in FIG. 2B, the end portions 52*a* and the end portions 52*b* of the oscillation damping member 52 are bent along side surfaces of the pressing member 62 (pressing portions 62*d*) in the longitudinal direction and the transverse direction, respectively, when the oscillation actuator is assembled. Thus, the end portions (oscillation damping portions) 52*a* and 52*b* are formed between the holding member 42 and the pressing member 62 to be in contact with the holding member 42 and the pressing member 62, respectively, when the oscillation actuator is assembled.

Ridge lines 62*c* of the pressing member 62 are chamfered into a C shape. This chamfering enables the oscillation damping member 52 to be easily bent when the oscillation actuator is assembled. Similarly, according to the first exemplary embodiment of the present disclosure, it may be desirable that a material such as felt having a small friction coefficient is used as the oscillation damping member 52. An effect of this is similar to the effect according to the first exemplary embodiment of the present disclosure.

Similarly, in the first exemplary embodiment of the present disclosure, the oscillation damping member 52 (oscillation damping portions 52*a* and 52*b*) can damp undesired oscillation which is generated on the holding member 42 as illustrated in FIGS. 7A and 7B. A damping effect is higher in the present embodiment than the effect in the first exemplary embodiment of the present disclosure because a larger number of the oscillation damping portions exist in the present exemplary embodiment (the two oscillation damping portions exist in the first exemplary embodiment, but the four oscillation damping portions exist in the present exemplary embodiment).

It may be desirable that the ridge lines 62c of the pressing member 62 have a chamfered shape (for example, a C chamfered shape or an R chamfered shape).

In the present exemplary embodiment, the oscillation damping member 52 as one part (integral member) is used. That is, the used oscillation damping member 52 is one part having the end portions (the oscillation damping portions) 52a and 52b and the central portion (the contact portion) 52c, which is in contact with the oscillation body 1 and the pressing member 62. Alternatively, the oscillation damping portions 52a and 52b may be separated from the contact portion 52c (into a plurality of parts). In a case of the separated parts, the end portions (oscillation damping portions) 52a and 52b are disposed on (bonded to) the side surfaces of the pressing portions 62d of the pressing member 62, respectively, or may be disposed on (bonded to) a hole portion 42c of the holding member 42 (an inner circumference of the holding member 42).

The details of the present disclosure have been described based on the exemplary embodiments, but the present disclosure is not limited to them and contains various modifications which do not deviate from the gist of the present disclosure. For example, in a third exemplary embodiment, a transducer of the present disclosure is applied not only to the rotary oscillation actuator illustrated in FIG. 7A but applicable also to a linear oscillation actuator and an oscillation actuator having a multi-degree of freedom.

The oscillation actuator according to the present exemplary embodiment of the present disclosure can be further used for various applications such as applications in driving a lens of an image capturing apparatus (optical device or electronic device), in rotation driving of a photoconductive drum of a copying machine (electronic device), and in driving a stage. As one example, an image capturing apparatus (optical device or electronic device), in which the oscillation actuator is used for driving a lens group disposed in a lens barrel, will be described.

Figure 3A:
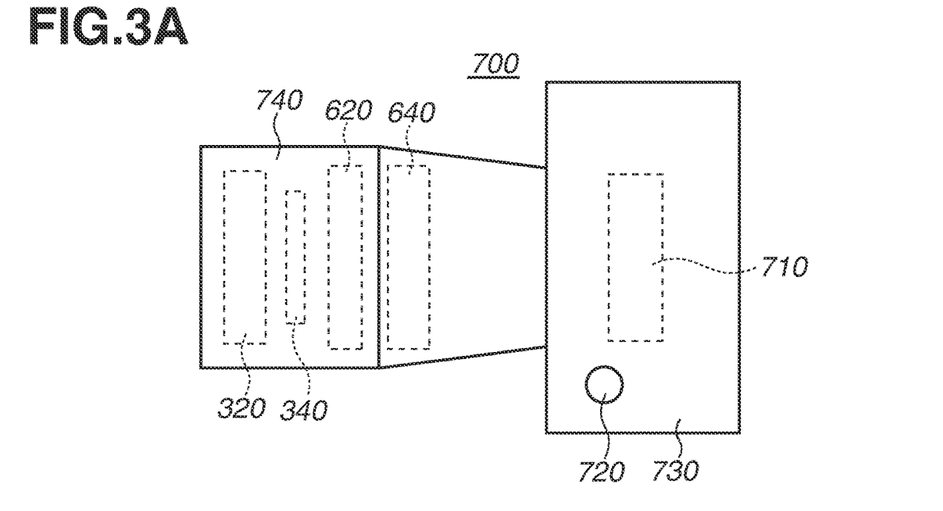
FIG. 3A is a schematic configurational diagram illustrating an image capturing apparatus having an oscillation actuator according to a third exemplary embodiment of the present disclosure.

FIG. 3A is a side view illustrating a schematic configuration of an image capturing apparatus 700. The image capturing apparatus 700 includes a camera main body 730 including an image sensor 710 and a power button 720. The image capturing apparatus 700 further includes a lens barrel 740 having a first lens group (not illustrated), a second lens group 320, a third lens group (not illustrated), a fourth lens group 340, and oscillation actuators 620 and 640. The lens barrel 740 is detachable, as an interchangeable lens, from the camera main body 730.

In the image capturing apparatus 700, the oscillation actuator 620 drives the second lens group 320, and the oscillation actuator 640 drives the fourth lens group 340. In the oscillation actuators 620 and 640, the oscillation bodies 1 and the contact body 8 described with reference to FIGS. 1A to 1C and FIGS. 2A and 2B are used, and they are disposed so that a radial direction is approximately orthogonal to an optical axis. For example, rotation of the contact body 8 included in the oscillation actuator 620 is converted into a straight-ahead motion in the optical axis direction by a not-illustrated cam ring and a position of the second lens group 320 in the optical axis direction is adjusted. The similar configuration can be provided to the oscillation actuator 640.

Figure 3B:
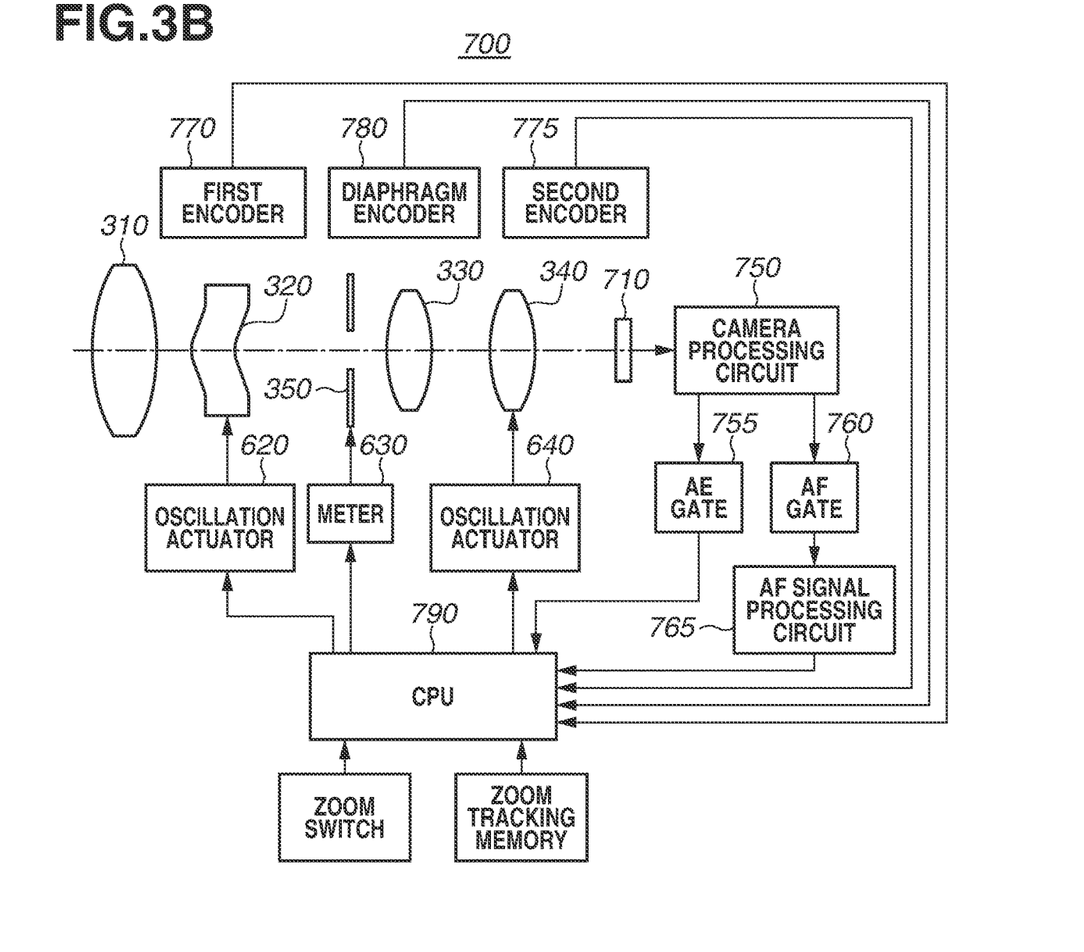
FIG. 3B is a block diagram illustrating the image capturing apparatus.

FIG. 3B is a block diagram illustrating a schematic configuration of the image capturing apparatus 700. A first lens group 310, the second lens group 320, a third lens group 330, the fourth lens group 340, and a light quantity adjustment unit 350 are disposed on predetermined positions on the optical axis inside the lens barrel 740. Light, which has passed through the first lens group 310 to the fourth lens group 340 and the light quantity adjustment unit 350, focuses on the image sensor 710 as an image. The image sensor 710 converts the optical image into an electric signal and outputs the electric signal to send it to a camera processing circuit 750.

The camera processing circuit 75 performs processes, such as amplification processing and gamma correction processing, to the output signal from the image sensor 710. The camera processing circuit 750 is connected to a central processing unit (CPU) 790 via an automatic exposure (AE) gate 755, and connected to the CPU 790 via an autofocus (AF) gate 760 and an AF signal processing circuit 765. A video signal to which predetermined processing is applied by the camera processing circuit 750 is sent to the CPU 790 via the AE gate 755, the AF gate 760, and the AF signal processing circuit 765. The AF signal processing circuit 765 extracts a high-frequency component of the video signal, generates an evaluation signal for autofocus (AF), and supplies the generated evaluation value to the CPU 790.

The CPU 790 is a control circuit, which controls an entire operation of the image capturing apparatus 700, and generates a control signal for determining exposure and focus from the acquired video signal. The CPU 790 controls driving of the oscillation actuators 620 and 640 and a meter 630 to achieve the determined exposure and the suitable focus state, thereby adjusting positions of the second lens group 320, the fourth lens group 340, and the light quantity adjustment unit 350 in the optical axis direction Under the control by the CPU 790, the oscillation actuator 620 moves the second lens group 320 to the optical axis direction, the oscillation actuator 640 moves the fourth lens group 340 to the optical axis direction, and the light quantity adjustment unit 350 is controlled based on the meter 630.

The position of the second lens group 320, which is driven by the oscillation actuator 620, in the optical axis direction is detected based on rotational angle information of a first encoder 770. The detected result is transmitted to the CPU 790 to be fed back for the driving of the oscillation actuator 620. Similarly, the position of the fourth lens group 340, which is driven by the oscillation actuator 640, in the optical axis direction is detected based on rotational angle information of a second encoder 775. The detected result is transmitted to the CPU 790 to be fed for the driving of oscillation actuator 640. The position of the light quantity adjustment unit 350 in the optical axis direction is detected by a diaphragm encoder 780, and the detected result is transmitted to the CPU 790 to be fed back for the driving of the meter 630.

According to the exemplary embodiments of the present disclosure, the oscillation damping member is disposed between the holding member and the pressing member to be in contact with the holding member and the pressing member, and damps undesired oscillation which is generated on the holding member.

According to the exemplary embodiments of the present disclosure, in the oscillation actuator, generation of an abnormal noise, which is caused by the undesired oscillation mode generated on the holding member, can be prevented without upsizing the holding member or reducing rigidity of the support portion.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-150554, filed Aug. 9, 2018, which is hereby incorporated by reference herein in its entirety.

What is claimed is:

1. An oscillation actuator comprising:
   an oscillation body;
   a contact body configured to be in contact with the oscillation body;
   a holding member having a through hole and configured to hold the oscillation body;
   a pressing member configured to press the oscillation body through the through hole; and
   an oscillation damping member configured to be in contact with the holding member and the pressing member between the holding member and the pressing member,
   wherein the oscillation damping member is in contact with the pressing member and the holding member on a side surface of the pressing member in a direction orthogonal to a pressing direction of the pressing member.

2. The oscillation actuator according to claim 1, further comprising a support member configured to support the holding member in a displaceable manner in the pressing direction.

3. The oscillation actuator according to claim 1, wherein the oscillation damping member is in contact with the pressing member and the holding member on the side surface in a relative moving direction of the oscillation body and the contact body.

4. The oscillation actuator according to claim 1, wherein the oscillation damping member is in contact with the pressing member and the holding member on the side surface in a direction orthogonal to a relative moving direction of the oscillation body and the contact body.

5. The oscillation actuator according to claim 1,
   wherein the oscillation damping member includes an oscillation damping portion and a contact portion,
   wherein the oscillation damping portion is in contact with the holding member and the pressing member, and
   wherein the contact portion is in contact with the oscillation body and the pressing member.

6. The oscillation actuator according to claim 5, wherein the oscillation damping portion and the contact portion are an integrated member.

7. The oscillation actuator according to claim 6, wherein the oscillation damping member is bent along a ridge line of the pressing member.

8. The oscillation actuator according to claim 7, wherein the ridge line has a C chamfered shape or an R chamfered shape.

9. The oscillation actuator according to claim 1, wherein a shape of the through hole is quadrangular as viewed from the pressing direction.

10. The oscillation actuator according to claim 1, wherein, when the oscillation actuator is driven, the holding member is oscillated in a rigid body mode in which the holding member is a rigid body.

11. An oscillation actuator main body comprising:
    an oscillation body;
    a holding member having a through hole and configured to hold the oscillation body;
    a pressing member configured to press the oscillation body through the through hole; and
    an oscillation damping member configured to be in contact with the holding member and the pressing member between the holding member and the pressing member,
    wherein the oscillation damping member is in contact with the pressing member and the holding member on a side surface of the pressing member in a direction orthogonal to a pressing direction of the pressing member.

12. An electronic device comprising:
    an oscillation actuator; and
    a member configured to be positioned by driving the oscillation actuator,
    wherein the oscillation actuator includes:
    an oscillation body,
    a contact body configured to be in contact with the oscillation body,
    a holding member having a through hole and configured to hold the oscillation body,
    a pressing member configured to press the oscillation body through the through hole, and
    an oscillation damping member configured to be in contact with the holding member and the pressing member between the holding member and the pressing member,
    wherein the oscillation damping member is in contact with the pressing member and the holding member on a side surface of the pressing member in a direction orthogonal to a pressing direction of the pressing member.

* * * * *